United States Patent
Han

(10) Patent No.: US 9,839,007 B2
(45) Date of Patent: Dec. 5, 2017

(54) METHOD AND APPARATUS FOR RESOURCE ALLOCATION OF BASE STATION, AND SERVER FOR MULTI-CELL COOPERATION USING UPLINK SIGNAL CHANNEL

(71) Applicant: Samsung Electronics Co., Ltd., Gyeonggi-do (KR)

(72) Inventor: Ki Young Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 92 days.

(21) Appl. No.: 14/376,072

(22) PCT Filed: Jan. 18, 2013

(86) PCT No.: PCT/KR2013/000403
§ 371 (c)(1),
(2) Date: Jul. 31, 2014

(87) PCT Pub. No.: WO2013/115511
PCT Pub. Date: Aug. 8, 2013

(65) Prior Publication Data
US 2014/0357287 A1 Dec. 4, 2014

(30) Foreign Application Priority Data
Jan. 31, 2012 (KR) .................. 10-2012-0009896

(51) Int. Cl.
*H04W 72/00* (2009.01)
*H04W 72/04* (2009.01)
(Continued)

(52) U.S. Cl.
CPC ............ *H04W 72/04* (2013.01); *H04B 7/024* (2013.01); *H04W 16/02* (2013.01); *H04W 72/0426* (2013.01)

(58) Field of Classification Search
USPC ........................................................ 455/450
See application file for complete search history.

(56) References Cited

U.S. PATENT DOCUMENTS 8,412,256 B2 4/2013 Lee et al.
2005/0047368 A1 3/2005 Kotzin et al.
(Continued)

FOREIGN PATENT DOCUMENTS

JP 2010199910 9/2010
JP 2011030126 2/2011
(Continued)

OTHER PUBLICATIONS

PCT/ISA/237 Written Opinion issued on PCT/KR2013/000403 (pp. 6).
(Continued)

*Primary Examiner* — Joel Ajayi
(74) *Attorney, Agent, or Firm* — The Farrell Law Firm, P.C.

(57) ABSTRACT

The present disclosure relates to a method and apparatus for resource allocation in a base station and a server for multi-cell coordination using an uplink signal channel. The resource allocation method for a base station (eNB) may include: receiving resource allocation information containing information on resources allocated to the eNB; receiving, when there is a need to change the allocated resources, changed resource allocation information containing information on changed resources; and distributing the changed resources to user equipments. The resource allocation method for a server may include: allocating resources to an eNB; sending resource allocation information containing information on the allocated resources; and sending, when there is a need to change the allocated resources, changed resource allocation information containing information on changed resources.

(Continued)

According to the present disclosure, it is possible to realize multi-cell coordination using an uplink signal channel through resource allocation of the eNB and server.

16 Claims, 12 Drawing Sheets

(51) Int. Cl.
 *H04B 7/024* (2017.01)
 *H04W 16/02* (2009.01)

(56) References Cited

U.S. PATENT DOCUMENTS

| | | | | |
|---|---|---|---|---|
| 2010/0110887 | A1* | 5/2010 | Beaujean | H04L 12/5695 370/230 |
| 2010/0202391 | A1* | 8/2010 | Palanki | H04W 72/0426 370/329 |
| 2010/0216450 | A1 | 8/2010 | Fujishima et al. | |
| 2010/0267408 | A1 | 10/2010 | Lee et al. | |

FOREIGN PATENT DOCUMENTS

| | | |
|---|---|---|
| KR | 1020060132550 | 12/2006 |
| KR | 1020090012714 | 2/2009 |
| KR | 1020100115653 | 10/2010 |
| WO | WO 2011/119750 | 9/2011 |

OTHER PUBLICATIONS

PCT/ISA/210 Search Report issed on PCT/KR2013/000403 (pp. 3).

Nokia Siemens Networks, "Autonomous Operational Carrier Selection Proposal", R3-113008, 3GPP TSG-RAN WG3 Meeting #74, Nov. 14-18, 2011, 8 pages.

European Search Report dated Aug. 10, 2015 issued in counterpart application No. 13743382.7-1857, 7 pages.

* cited by examiner

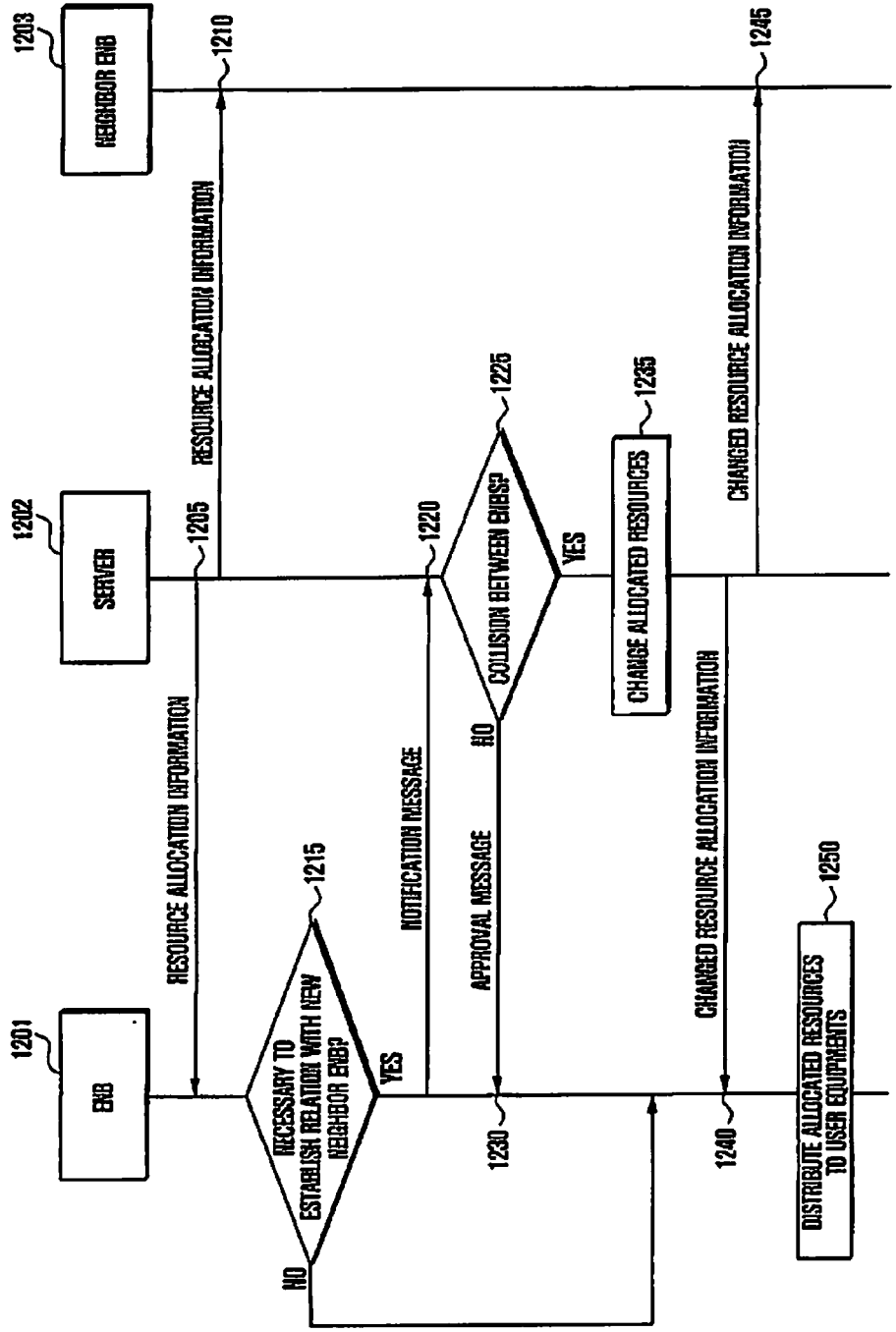

METHOD AND APPARATUS FOR RESOURCE ALLOCATION OF BASE STATION, AND SERVER FOR MULTI-CELL COOPERATION USING UPLINK SIGNAL CHANNEL

TECHNICAL FIELD

The present disclosure relates to a method and apparatus for resource allocation in a base station and a server for multi-cell coordination using an uplink signal channel.

BACKGROUND ART

Recently, various schemes based on inter-cell interference control have been proposed to enhance throughput of the system and a user equipment placed at a cell edge. 3GPP and IEEE also deal with Inter-Cell Interference Coordination (ICIC), Fractional Frequency Reuse (FFR), Coordinated Multiple Point (COMP) and the like.

FIG. 1 illustrates a cell including a plurality of Radio Remote Heads (RRHs) according to the related art. In the present disclosure, it is assumed that a plurality of RRHs are present in each cell. In this environment, multiple RRHs belonging to one cell utilize the same cell ID and a user equipment may recognize these multiple RRHs as a single cell. Hence, although the user equipment moves between RRHs in a cell, handover is not incurred.

In addition, it is possible to enhance system throughput by use of spatial multiplexing wherein user equipments close to one RRH utilize the same frequency resources at the same time. It is also possible to enhance reception quality of a user equipment placed in the boundary between RRHs by transmitting the same data from multiple nearby RRHs or preventing RRHs other than RRHs transmitting data from using the corresponding resources.

To this end, it should be possible to measure channel quality between each RRH and the user equipment. However, as the user equipment cannot distinguish RRHs on the basis of downlink signals sent by the RRHs, it is not possible to measure channel quality using a downlink signal. On the other hand, it is possible for an RRH to measure channel quality between the RRH and user equipment using an uplink signal sent by the user equipment.

The uplink channel may be generally divided into a signal channel and a traffic channel. The signal channel indicates a channel that includes only physical-layer information without information related to the Medium Access Control (MAC) layer or higher. In the case of 3GPP Long Term Evolution (LTE), the sounding reference signal (SRS) and demodulation reference signal (DMRS) correspond to the signal channel. On the other hand, the traffic channel includes information related to the MAC layer or higher. In the case of 3GPP LTE, the PUCCH and PUSCH correspond to the traffic channel. In general, for detection of a signal sent by a user equipment in a neighbor cell, utilization of the signal channel transmitting physical-layer information only has an advantage over utilization of the traffic channel.

To support control of RRH-unit interference between RRHs in different cells (not using the same resources or transmitting the same data), it should be possible to measure a signal sent by a user equipment in a neighbor cell. However, in the related art, as each base station (eNB) independently operates the uplink signal channel, a signal sent by a user equipment in a neighbor cell is not measured and information needed for measurement is not exchanged.

DISCLOSURE OF INVENTION

Technical Problem

Aspects of the present disclosure are to address at least the above mentioned problems. Accordingly, an aspect of the present disclosure is to provide a resource allocation method and apparatus for a base station and a server that realize multi-cell coordination using an uplink signal channel.

Solution to Problem

In accordance with an aspect of the present disclosure, a method of resource allocation for a base station for multi-cell coordination using an uplink signal channel is provided. The resource allocation method may include: receiving resource allocation information containing information on resources allocated to the base station (eNB); receiving, when there is a need to change the allocated resources, changed resource allocation information containing information on changed resources; and distributing the changed resources to user equipments.

In accordance with another aspect of the present disclosure, an apparatus of resource allocation for a base station for multi-cell coordination using an uplink signal channel is provided. The resource allocation apparatus may include: a communication unit to communicate with a server; and a control unit to control a process of receiving resource allocation information containing information on resources allocated to the base station (eNB), receiving, when there is a need to change the allocated resources, changed resource allocation information containing information on changed resources, and distributing the changed resources to user equipments.

In accordance with another aspect of the present disclosure, a method of resource allocation for a server for multi-cell coordination using an uplink signal channel is provided. The resource allocation method may include: allocating resources to a base station (eNB); sending resource allocation information containing information on the allocated resources; and sending, when there is a need to change the allocated resources, changed resource allocation information containing information on changed resources.

In accordance with another aspect of the present disclosure, an apparatus of resource allocation for a server for multi-cell coordination using an uplink signal channel is provided. The resource allocation apparatus may include: a communication unit to communicate with a base station (eNB); and a control unit to control a process of allocating resources to the eNB, sending resource allocation information containing information on the allocated resources, and sending, when there is a need to change the allocated resources, changed resource allocation information containing information on changed resources.

Advantageous Effects of Invention

In a feature of the present disclosure, multi-cell coordination using an uplink signal channel may be realized through resource allocation by a base station and a server.

BRIEF DESCRIPTION OF DRAWINGS

FIG. 12 is a sequence diagram illustrating interactions between the base station and server according to another embodiment of the present disclosure.

MODE FOR THE INVENTION

In the present disclosure, a "resource" denotes an uplink signaling channel resource.

Hereinafter, exemplary embodiments of the present disclosure are described in detail with reference to the accompanying drawings. Detailed descriptions of well-known functions and structures incorporated herein may be omitted to avoid obscuring the subject matter of the present disclosure.

Particular terms may be defined to describe the disclosure in the best manner. Accordingly, the meaning of specific terms or words used in the specification and the claims should not be limited to the literal or commonly employed sense, but should be construed in accordance with the spirit of the present disclosure. The description of the various embodiments is to be construed as exemplary only and does not describe every possible instance of the present disclosure. Therefore, it should be understood that various changes may be made and equivalents may be substituted for elements of the present disclosure.

To realize multi-cell coordination using an uplink signal channel according to the present disclosure, it should be possible to detect and measure a signal sent by a user equipment served by a neighbor base station (neighbor eNB). To this end, an eNB has to obtain information needed to detect the signal channel of a neighbor eNB. That is, the eNB has to obtain information on time-frequency resources and codes (or sequences) used by the neighbor eNB. In addition, the eNB should not use the same time-frequency resources as those used by the neighbor eNB. Next, a method and apparatus satisfying the above conditions is described.

First, a description is given a scheme that may be used by a server to allocate uplink signal channel resources to an eNB for multi-cell coordination using an uplink signal channel. Uplink signal channel resources may be allocated through resource indexing. Here, uplink signal channel resources of interest for multi-cell coordination are divided into minimum allocation units. An allocation unit indicates a minimum amount of a resource allocable to one eNB. The eNB distributes a portion of allocated resources to user equipments.

Figure 1:
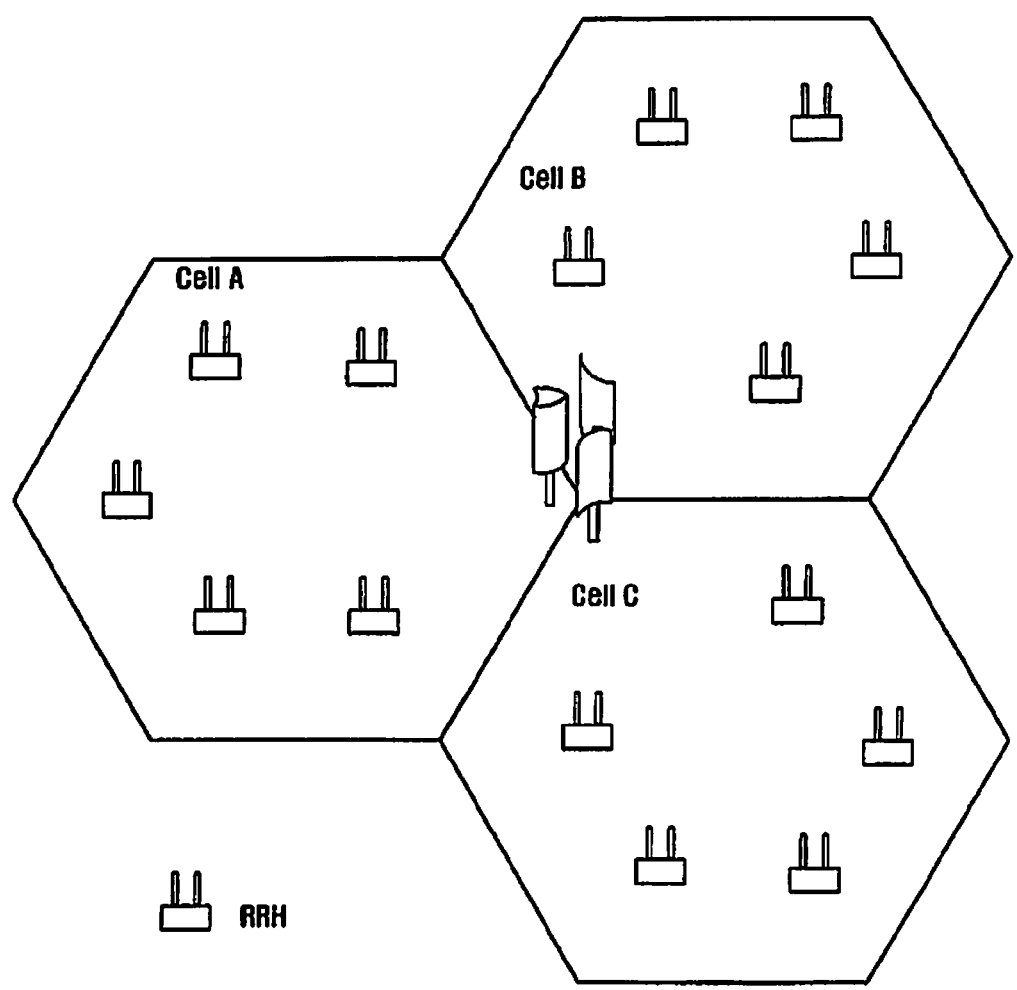
FIG. 1 illustrates a cell including a plurality of RRHs according to the related art.
Figure 2:
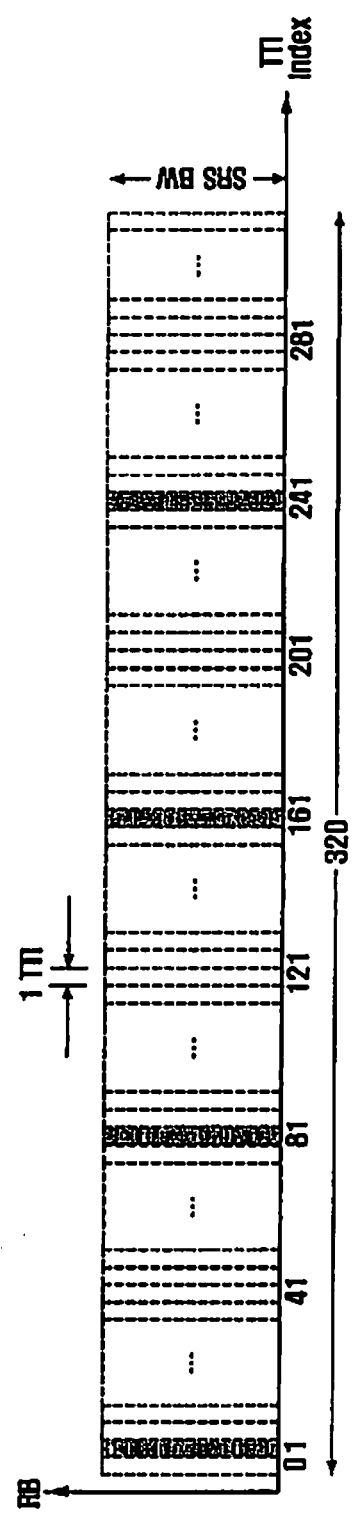
FIG. 2 illustrates allocation units for the signal channel according to an embodiment of the present disclosure.

FIG. 2 illustrates allocation units for the signal channel according to an embodiment of the present disclosure.

FIG. 2 depicts examples of allocation units when the signal channel is a Sounding Reference Signal (SRS). As the SRS can be periodically transmitted, an SRS period can be used.

According to the 3GPP LTE specification, the maximum SRS period is 320 ms. In FIG. 2, the SRS is allocated in the minimum unit of 4 ms. In this case, total 80 resources may be allocated to eNBs. When the time resource is divided in the minimum unit as shown in FIG. 2, it is possible to prevent the time resource from varying according to the system bandwidth. That is, even when the system bandwidth is changed to 5, 10 or 20 MHz, the same scheme can be applied.

In FIG. 2, four Transmission Time Intervals (TTIs) can be allocated to each eNB (in LTE, one TTI corresponds to 1 ms), and TTIs are divided in an interlaced manner. Shaded TTIs indicate TTIs allocated to an eNB of interest.

Figure 3:
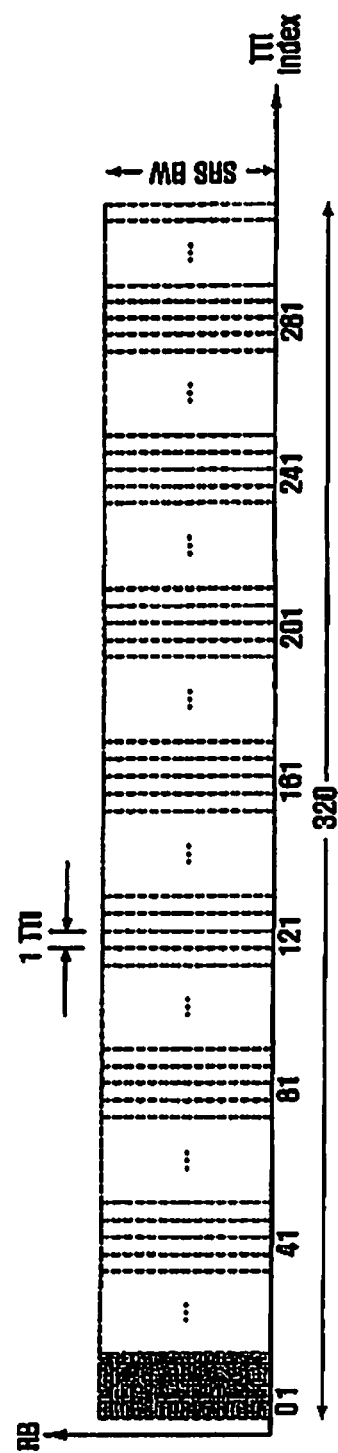
FIG. 3 illustrates allocation units for the signal channel according to another embodiment of the present disclosure.

FIG. 3 illustrates allocation units for the signal channel according to another embodiment of the present disclosure. Here, four minimally allocable TTIs are consecutively allocated.

Next, on the basis of the above information, a description is given of the overall system according to an embodiment of the present disclosure.

Figure 4:
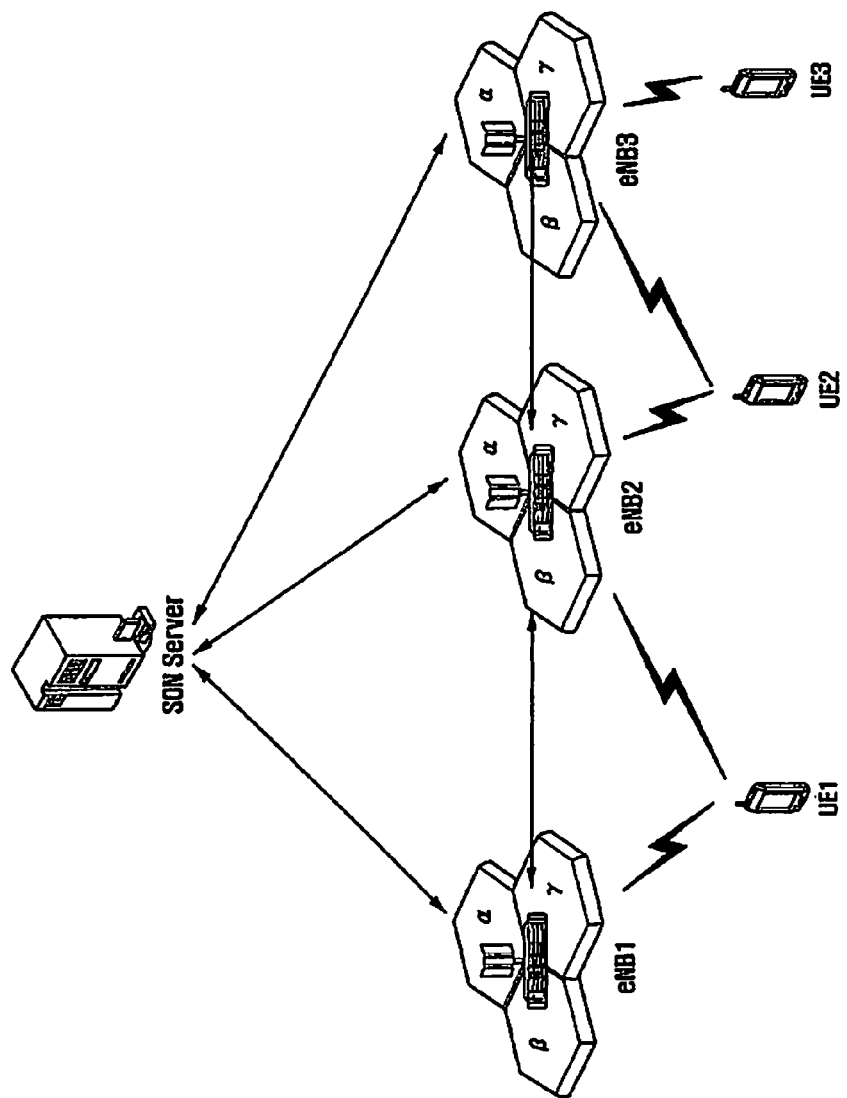
FIG. 4 illustrates a system for multi-cell coordination using uplink signal channels according to an embodiment of the present disclosure.

FIG. 4 illustrates a system for multi-cell coordination using uplink signal channels according to an embodiment of the present disclosure.

In the multi-cell coordination system of the present disclosure, the Self Organizing Network (SON) Server interconnects individual eNBs at the topmost layer, and each eNB communicates user equipments (UEs). Here, a user equipment may communicate not only with the attached eNB but also with a neighbor eNB. To this end, one eNB has to obtain information needed to detect the signal channel of a neighbor eNB and should not use the same time-frequency resource as that used by the neighbor eNB.

Figure 5:
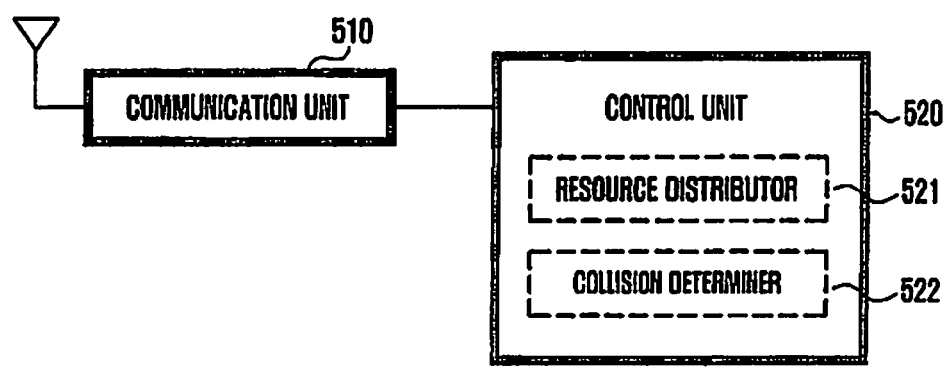
FIG. 5 illustrates a configuration of a resource allocation apparatus for a base station according to an embodiment of the present disclosure.

FIG. 5 illustrates a configuration of a resource allocation apparatus for a base station according to an embodiment of the present disclosure. The resource allocation apparatus 500 of a base station (eNB) may include a communication unit 510 and a control unit 520.

The communication unit 510 sends and receives data to and from an external entity. In particular, the communication unit 510 may connect to a server and receive resource allocation information therefrom. Here, the communication unit 510 may also receive information that is needed to detect a signal sent by a user equipment communicating with a neighbor eNB from the server. The information needed for detection may include information necessary for resource index and sequence generation. In addition, the communication unit 510 may send a collision message and a notification message to the server and receive corresponding responses therefrom.

The communication unit 510 is capable of communicating with a neighbor eNB. The communication unit 510 may receive resource allocation information from the neighbor eNB and send resource allocation information of the attached eNB to the neighbor eNB.

The control unit 520 controls overall operations of individual components of the eNB. In particular, the control unit 520 may control a process of receiving resource allocation information containing information on resources allocated to the eNB, receiving, if there is a need to change the allocated resources, changed resource allocation information containing information on changed resources, and distributing the changed resources to user equipments. To this end, the control unit 520 may include a resource distributor 521 and a collision determiner 522.

The resource distributor 521 may distribute resources allocated to the eNB to user equipments. In one embodiment, if there is no need to change the allocated resources, the resource distributor 521 may directly distribute the allocated resources to a user equipment. If there is a need to change the allocated resources, the resource distributor 521 may receive changed resource allocation information containing information on changed resources from the server and then distribute the changed resources to a user equipment.

The collision determiner 522 determines whether resources allocated to the eNB collide with resources allocated to a neighbor eNB. Upon determining that resources allocated to the eNB collide with resources allocated to the neighbor eNB, the collision determiner 522 may control the communication unit 510 to send a collision message. In one embodiment, if resources allocated to the eNB are the same as resources allocated to the neighbor eNB, the collision determiner 522 may declare a collision. The collision determiner 522 may control the communication unit 510 to send a collision message together with resource allocation information of the neighbor eNB.

The control unit 520 may control the communication unit 510 to send a notification message when it is necessary to establish a relation with a new neighbor eNB, and may control the communication unit 510 to receive resource allocation information containing information on changed resources as a reply to the notification message.

In the above description, the control unit 520, the resource distributor 521 and the collision determiner 522 are depicted as separate blocks, and the resource distributor 521 and the collision determiner 522 are depicted as having distinct functions. However, this is solely for ease of description, and it is not required to divide functions as such. For example, the control unit 520 may directly perform the functions of the resource distributor 521 and collision determiner 522.

Figure 6:
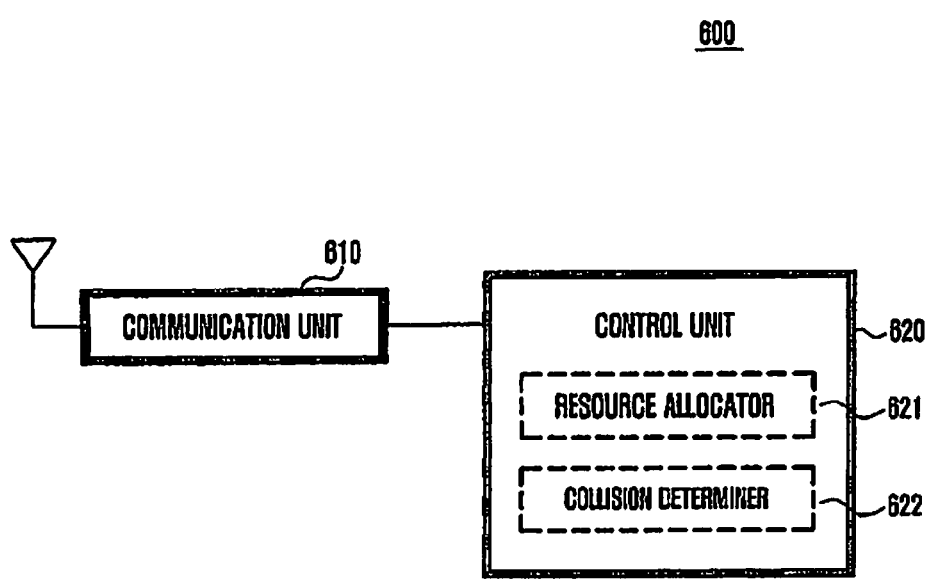
FIG. 6 illustrates a configuration of a resource allocation apparatus for a server according to an embodiment of the present disclosure.

FIG. 6 illustrates a configuration of a resource allocation apparatus for a server according to an embodiment of the present disclosure. The resource allocation apparatus 600 for the server may include a communication unit 610 and a control unit 620. Here, the server may be a SON server.

The communication unit 610 sends and receives data to and from an external entity. In particular, the communication unit 610 may connect to an eNB and send resource allocation information thereto. Here, the communication unit 610 may also send information that is needed to detect a signal sent by a user equipment communicating with a neighbor eNB. The information needed for detection may include information necessary for resource index and sequence generation. In addition, the communication unit 610 may receive a collision message and a notification message from an eNB and send corresponding responses thereto.

The control unit 620 controls overall operations of individual components of the server. In particular, the control unit 620 may control a process of allocating resources to an eNB, sending resource allocation information containing information on resources allocated to the eNB, and sending, if there is a need to change the allocated resources, changed resource allocation information containing information on changed resources. To this end, the control unit 620 may include a resource allocator 621 and a collision determiner 622.

In one embodiment, the resource allocator 621 may allocate resources to an eNB and change the resources allocated to the eNB if necessary. In addition, the resource allocator 621 may control the communication unit 610 to send resource allocation information containing information on allocated resources to the eNB.

In one embodiment, upon reception of a collision message indicating that resources allocated to one eNB and its neighbor eNB collide, the resource allocator 621 may change the resources allocated to the eNB and control the communication unit 610 to send changed resource allocation information as a reply to the collision message. To change resources allocated to the eNB, the resource allocator 621 may receive resource allocation information from the neighbor eNB and replace the resources allocated to the eNB with resources not allocated to the neighbor eNB on the basis of the received resource allocation information of the neighbor eNB.

Upon reception of a notification message indicating necessity of establishing a relation with a new neighbor eNB, the collision determiner 622 determines whether resources allocated to the eNB collide with resources allocated to the new neighbor eNB. Upon determining that resources allocated to the eNB collide with resources allocated to the new neighbor eNB, the collision determiner 622 may change the resources allocated to the eNB and control the communication unit 610 to send resource allocation information containing information on the changed resources as a reply to the notification message.

In one embodiment, if resources allocated to the eNB are the same as resources allocated to the new neighbor eNB, the collision determiner 622 may declare a collision.

In the above description, the control unit 620, the resource allocator 621 and the collision determiner 622 are depicted as separate blocks, and the resource allocator 621 and the collision determiner 622 are depicted as having distinct functions. However, this is solely for ease of description, and it is not required to divide functions as such. For example, the control unit 620 may directly perform the functions of the resource allocator 621 and collision determiner 622.

Figure 7:
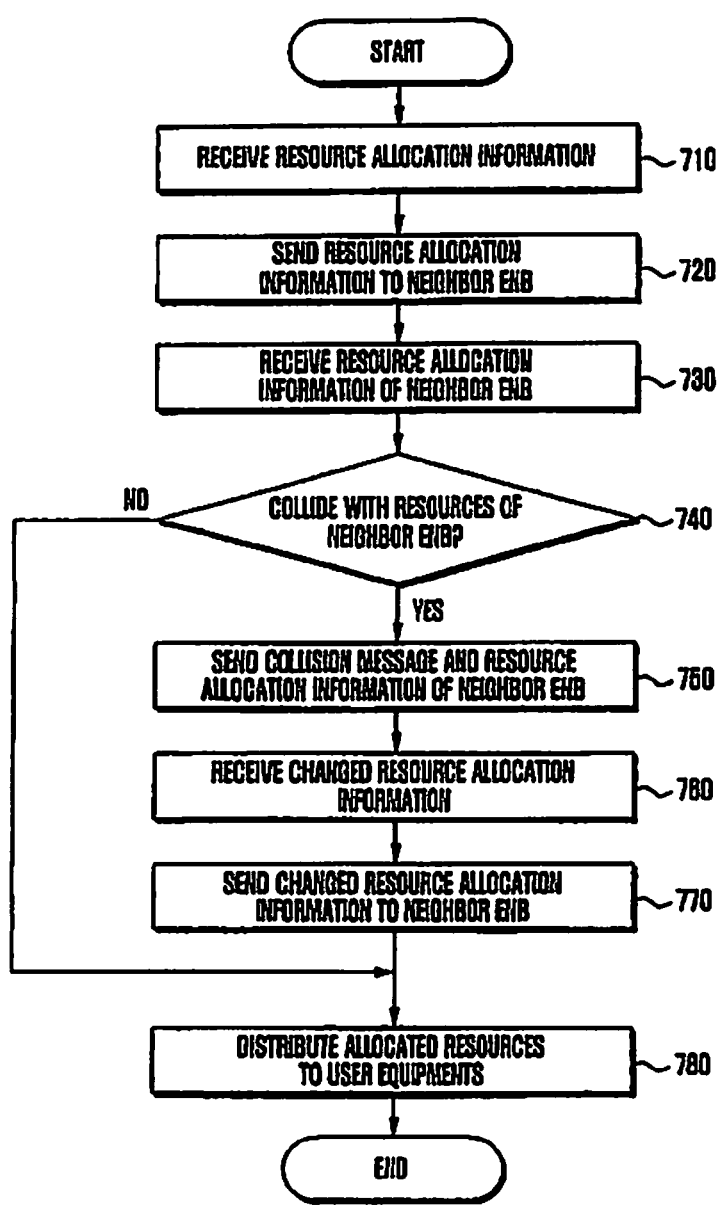
FIG. 7 is a flowchart of a resource allocation method for the base station according to an embodiment of the present disclosure.

FIG. 7 is a flowchart of a resource allocation method for a base station according to an embodiment of the present disclosure.

At operation 710, the control unit 520 in an eNB receives resource allocation information containing information on allocated resources from the server. Here, the control unit 520 may also receive information that is needed to detect a signal sent by a user equipment communicating with a neighbor eNB from the server. The information needed for detection may include information necessary for resource index and sequence generation. At operation 720, the control unit 520 sends the received resource allocation information to the neighbor eNB. At operation 730, the control unit 520 receives resource allocation information of the neighbor eNB.

At operation 740, the control unit 520 determines whether resources allocated to the eNB collide with resources allocated to the neighbor eNB on the basis of the resource allocation information of the eNB and the neighbor eNB. When resources allocated to the eNB are the same as resources allocated to the neighbor eNB, a collision is declared. For an eNB under consideration, the range for collision determination includes up to a two-tier neighbor eNB (i.e. a third eNB connected with the eNB under consideration through a neighbor eNB of the eNB under consideration). When resources allocated to the eNB under consideration are identical to those allocated to an immediate neighbor eNB or identical to those allocated to a two-tier neighbor eNB, a collision may be declared.

Through exchange of resource allocation information between neighbor eNBs, one eNB may obtain information needed for detecting a signal channel of a neighbor eNB and may check a resource collision with the neighbor eNB on the basis of the received information. For realization of multi-cell coordination using an uplink signal channel, to avoid a collision, it is necessary to check whether the same resources are used by different eNBs with which a user equipment may communicate.

Upon determining that resources allocated to the eNB collide with resources allocated to the neighbor eNB at operation 740, the control unit 520 proceeds to operation 750 at which the control unit 520 sends a collision message indicating a resource collision between the eNB and the neighbor eNB to the server. At operation 760, the control unit 520 receives changed resource allocation information as a reply to the collision message. At operation 770, the control unit 520 sends the changed resource allocation information to the neighbor eNB. Thereafter, at operation 780, the control unit 520 distributes allocated resources to the user equipment. At transmission of the collision message to the server, resource allocation information of the neighbor eNB may also be transmitted so that the server may refer to the same for resource change.

Upon determining that resources allocated to the eNB do not collide with resources allocated to the neighbor eNB at operation 740, the control unit 520 proceeds to operation 780 at which the control unit 520 distributes allocated resources to the user equipment.

In the present embodiment, as an eNB checks occurrence of a resource collision, it is necessary for the eNB to exchange resource allocation information with a neighbor eNB through communication.

Figure 8:
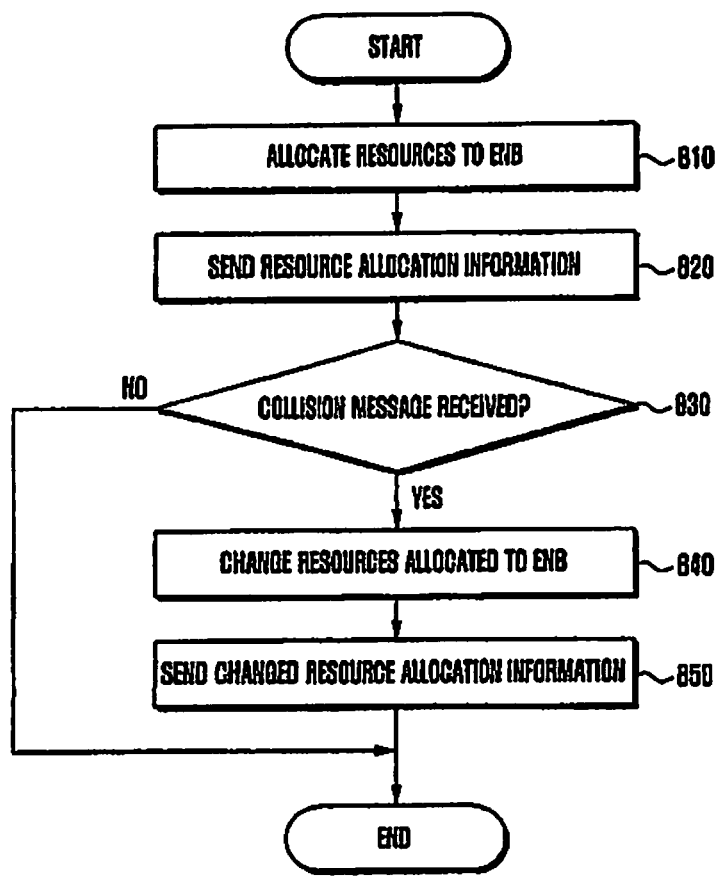
FIG. 8 is a flowchart of a resource allocation method for the server according to an embodiment of the present disclosure.

FIG. 8 is a flowchart of a resource allocation method for the server according to an embodiment of the present disclosure.

At operation 810, the control unit 620 in the server allocates resources to an eNB. Resource allocation is performed through resource indexing as described in connection with FIGS. 2 and 3. At operation 820, the control unit 620 sends resource allocation information containing information on allocated resources to the eNB. Here, the control unit 620 may also send information that is needed to detect a signal sent by a user equipment communicating with a neighbor eNB. The information needed for detection may include information necessary for resource index and sequence generation.

At operation 830, the control unit 620 checks whether a collision message is received from the eNB. If a collision message is received, the control unit 620 proceeds to operation 840 at which the control unit 620 changes the resources allocated to the eNB. At operation 850, the control unit 620 sends changed resource allocation information to the eNB.

To change resources allocated to an eNB, the control unit 620 may receive resource allocation information of the eNB and its neighbor eNB, randomly select resources not on the resource index list on the basis of the received resource allocation information, and replace the resources allocated to the eNB with the selected resources. Additionally, when location information is available, the server may change resources allocated to one eNB according to the minimum reuse distance (MRD).

Figure 9:
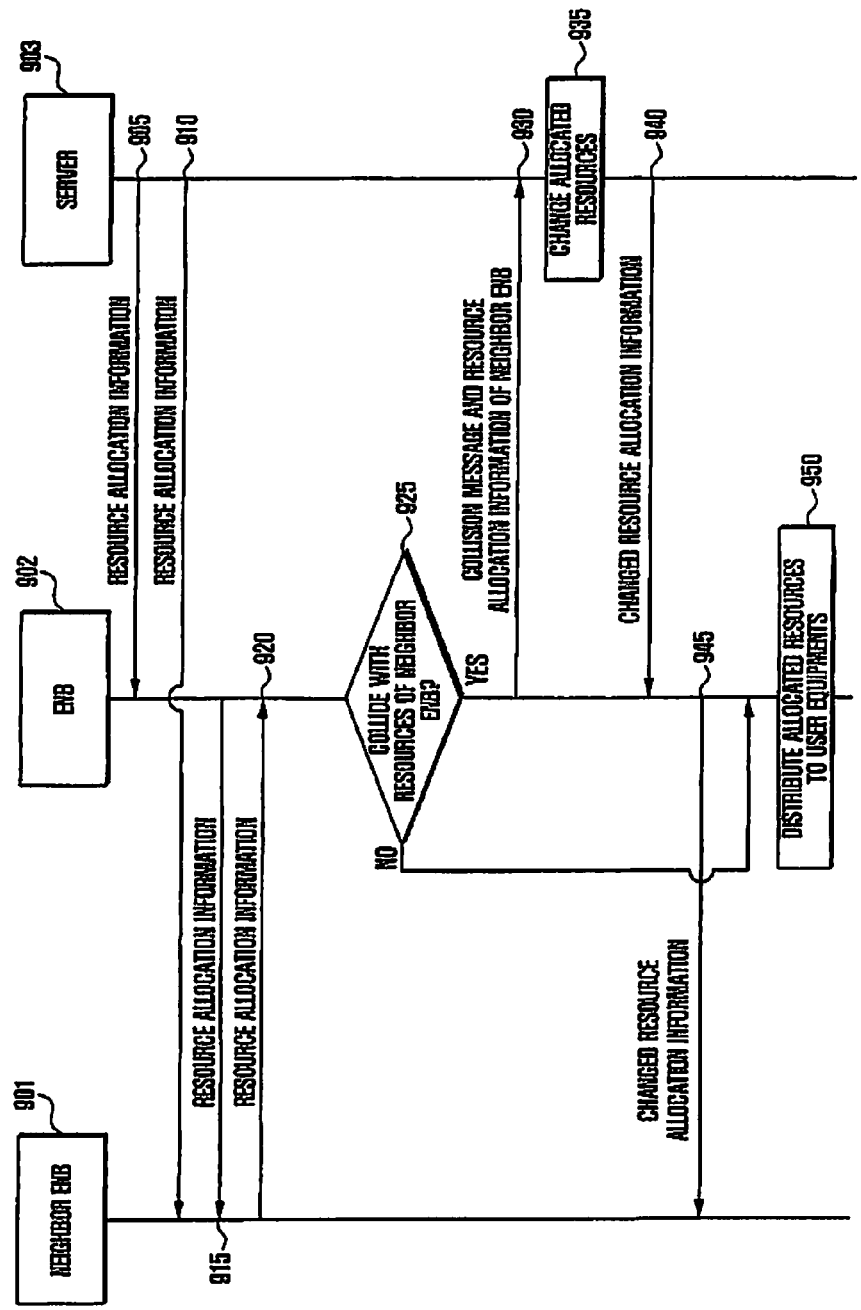
FIG. 9 is a sequence diagram illustrating interactions between the base station and server according to an embodiment of the present disclosure.

FIG. 9 is a sequence diagram illustrating interactions between the base station and server according to an embodiment of the present disclosure.

At operations 905 and 910, the server 903 allocates resources to individual eNBs 901 and 902 and sends resource allocation information thereto. Here, the server 903 may also send information that is needed to detect a signal sent by a user equipment communicating with a neighbor eNB. The information needed for detection may include information necessary for resource index and sequence generation.

At operation 915, the eNB 902 sends the received resource allocation information to the neighbor eNB 901. At operation 920, the neighbor eNB 901 sends the received resource allocation information to the eNB 902. At operation 925, the eNB 902 checks whether resources used by the eNB 902 collide with resources used by the neighbor eNB 901 on the basis of the resource allocation information received from the neighbor eNB.

Upon determining that resources used by the eNB 902 collide with resources used by the neighbor eNB 901, at operation 930, the eNB 902 sends a collision message and resource allocation information of the neighbor eNB 901 to the server 903. At operation 935, the server 903 changes the resources allocated to the eNB 902. At operation 940, the server 903 sends changed resource allocation information to the eNB 902. Upon reception of the changed resource allocation information, at operation 945, the eNB 902 forwards the changed resource allocation information to the neighbor eNB 901. Thereafter, at operation 950, the eNB 902 distributes the allocated resources to user equipments.

Upon determining that resources used by the eNB 902 do not collide with resources used by the neighbor eNB 901 at operation 925, the eNB 902 proceeds to operation 950 at which the eNB 902 distributes the allocated resources to user equipments.

Figure 10:
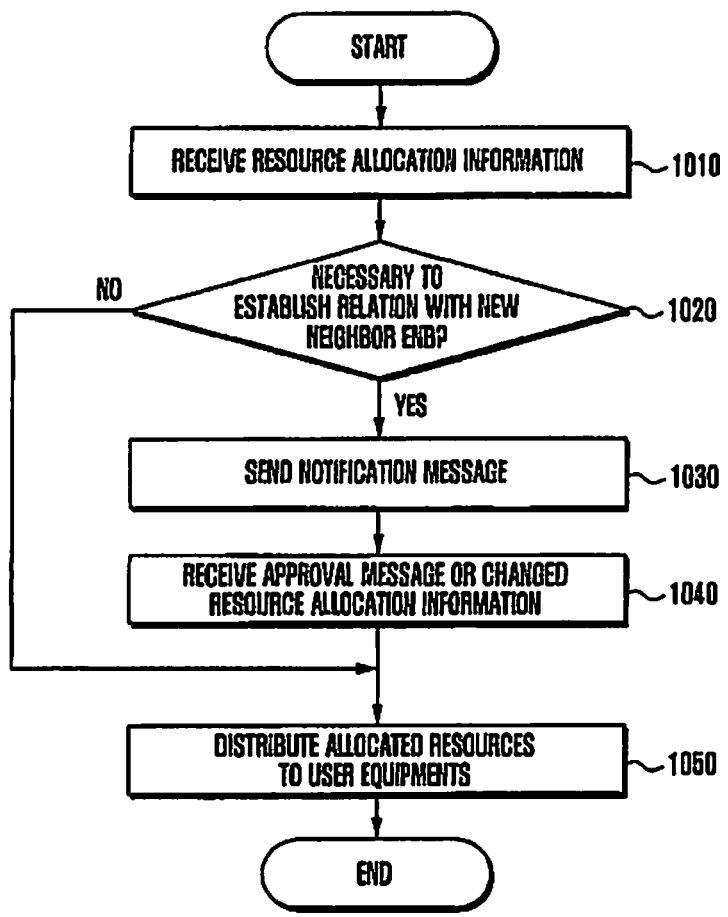
FIG. 10 is a flowchart of a resource allocation method for the base station according to another embodiment of the present disclosure.

FIG. 10 is a flowchart of a resource allocation method for the base station according to another embodiment of the present disclosure.

At operation 1010, the control unit 620 of an eNB receives resource allocation information containing information on allocated resources from the server. Here, the control unit 520 may also receive information that is needed to detect a signal sent by a user equipment communicating with a neighbor eNB from the server. The information needed for detection may include information necessary for resource index and sequence generation.

At operation 1020, the control unit 520 determines whether it is necessary to establish a relation with a new neighbor eNB. When a new neighbor eNB is detected through the Automatic Neighbor Relation (ANR) function, it may be necessary to establish a relation. In this case, the control unit 520 may obtain resource allocation information of the new neighbor eNB.

Upon determining that it is necessary to establish a relation with a new neighbor eNB, the control unit 520 proceeds to operation 1030 at which the control unit 520 sends a notification message to the server. Here, the control unit 520 may send resource allocation information of the new neighbor eNB together with the notification message so that the server may refer to the same for collision checking. At operation 1040, the control unit 520 receives an approval message or changed resource allocation information as a reply to the notification message from the server. At operation 1050, the control unit 520 distributes the allocated resources to user equipments. When an approval message is received, originally allocated resources are distributed; and when changed resource allocation information is received, change resources are distributed.

Upon determining that it is not necessary to establish a relation with a new neighbor eNB at operation 1020, the control unit 520 proceeds to operation 1050 at which the control unit 520 distributes the allocated resources to user equipments.

Figure 11:
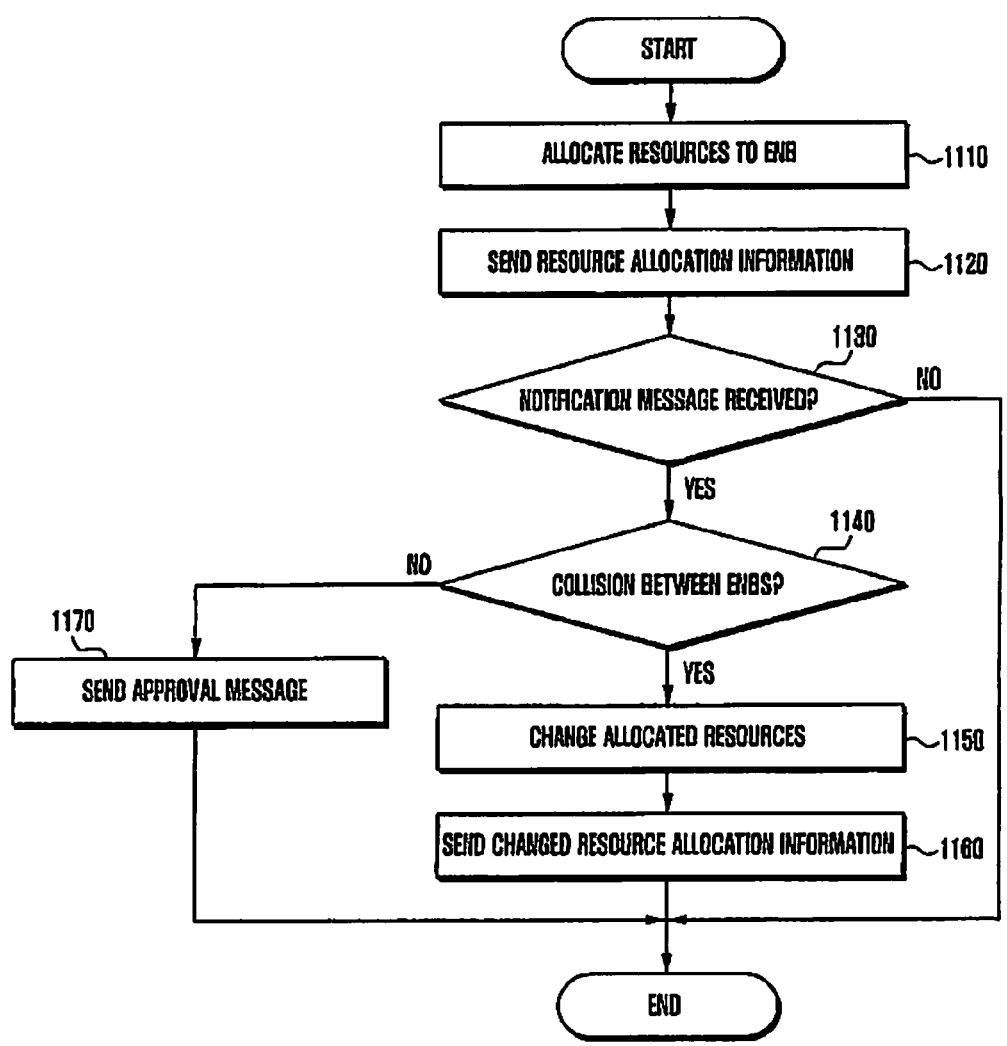
FIG. 11 is a flowchart of a resource allocation method for the server according to another embodiment of the present disclosure.

FIG. 11 is a flowchart of a resource allocation method for the server according to another embodiment of the present disclosure.

At operation 1110, the control unit 620 in the server allocates resources to an eNB. Resource allocation is performed through resource indexing as described in connection with FIGS. 2 and 3. At operation 1120, the control unit 620 sends resource allocation information containing information on allocated resources to the eNB. Here, the control unit 620 may also send information that is needed to detect a signal sent by a user equipment communicating with a neighbor eNB. The information needed for detection may include information necessary for resource index and sequence generation.

At operation 1120, the control unit 620 checks whether a notification message indicating necessity of establishing a relation with a new neighbor eNB is received from the eNB. If a notification message indicating necessity of establishing a relation with a new neighbor eNB is received, the control unit 620 proceeds to operation 1140 at which the control unit 620 determines whether a collision between the resources allocated to the eNB and those allocated to the new neighbor eNB is present. The control unit 620 may declare a resource collision if the resources allocated to the eNB are the same as those allocated to the new neighbor eNB.

Upon determining that the resources allocated to the eNB collide with those allocated to the new neighbor eNB at operation 1140, the control unit 620 proceeds to operation 1150 at which the control unit 620 changes the resources allocated to the eNB. At operation 1160, the control unit 620 sends changed resource allocation information to the eNB.

To change resources allocated to an eNB under consideration, the control unit 620 may select a resource index that is neither used by an immediate neighbor eNB nor used by a two-tier neighbor eNB. In addition, when the control unit 620 sends changed resource allocation information to the eNB under consideration, it may also send the same to neighbor eNBs thereof.

In the present embodiment, as the server determines occurrence of a resource collision, the server sends resource allocation information of one eNB to its neighbor eNBs. As such, each eNB may obtain information needed to detect the signal channel of its neighbor eNB.

Upon determining that the resources allocated to the eNB do not collide with those allocated to the new neighbor eNB at operation 1140, the control unit 620 proceeds to operation 1170 at which the control unit 620 sends an approval message to the eNB.

FIG. 12 is a sequence diagram illustrating interactions between the base station and server according to another embodiment of the present disclosure.

At operations 1205 and 1210, the server 1202 allocates resources to individual eNBs 1201 and 1203 and sends resource allocation information thereto. Here, the server 903 may also send information that is needed to detect a signal sent by a user equipment communicating with a neighbor eNB. The information needed for detection may include information necessary for resource index and sequence generation. At operation 1215, the eNB 1201 determines whether it is necessary to establish a relation with a new neighbor eNB. Upon determining that it is necessary to establish a relation with a new neighbor eNB, at operation 1220, the eNB 1201 sends a notification message to the server 1202.

Upon reception of the notification message, at operation 1225, the server 1202 determines whether the resources allocated to the eNB collide with those allocated to the new neighbor eNB. Upon determining that the resources allocated to the eNB do not collide with those allocated to the new neighbor eNB, at operation 1230, the server 1202 sends an approval message to the eNB 1201. Upon determining that the resources allocated to the eNB collide with those allocated to the new neighbor eNB, at operation 1235, the server 1202 changes the resources allocated to the eNB 1201. Thereafter, at operation 1240, the server 1202 sends changed resource allocation information to the eNB 1201. At operation 1245, the server 1202 sends the changed resource allocation information of the eNB 1201 to the neighbor eNB 1203.

Upon reception of the changed resource allocation information, at operation 1250, the eNB 1201 distributes the allocated resources to user equipments. Upon determining that it is not necessary to establish a relation with a new neighbor eNB at operation 1215, at operation 1250, the eNB 1201 distributes the allocated resources to user equipments.

Hereinabove, various embodiments of the present disclosure has been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents.

The invetion claimed is:

1. A method of resource allocation by a base station (eNB) for multi-cell coordination using an uplink signal channel, the method comprising:
   receiving, from a server, resource allocation information including information on resources allocated to the eNB, the resources being associated with an uplink signaling channel resource;
   determining that the resources allocated to the eNB collide with resources allocated to a neighbor eNB;
   transmitting, to the server, a collision message and neighbor resource allocation information of the neighbor eNB when the resources allocated to the eNB collide with the resources allocated to the neighbor eNB, the neighbor resource allocation information including information on the resources allocated to the neighbor eNB;
   receiving, from the server, changed resource allocation information including information on changed resources allocated to the eNB, the changed resources being associated with a resource index excluding a resource index used by the neighbor eNB; and
   distributing the changed resources to a user equipment.

2. The method of claim 1, wherein determining that the resources allocated to the eNB collide with the resources allocated to the neighbor eNB comprises:
   receiving the neighbor resource allocation information; and
   determining whether the resources allocated to the eNB collide with the resources allocated to the neighbor eNB, based on the resource allocation information of the eNB and the neighbor resource allocation information of the neighbor eNB.

3. The method of claim 2, wherein the resources allocated to the eNB collide with the resources allocated to the neighbor eNB when the resources allocated to the eNB are the same as the resources allocated to the neighbor eNB.

4. The method of claim 1, further comprising:
determining that a relation with a new neighbor eNB is to be established;
transmitting, to the server, a notification message requesting to establish the relation with the new neighbor eNB; and
receiving, from the server, another changed resource allocation information, in response to the notification message.

5. A method of resource allocation by a server for multi-cell coordination using an uplink signal channel, the method comprising:
allocating resources to a base station (eNB);
transmitting, to the eNB, resource allocation information including information on the resources allocated to the eNB, the resources being associated with an uplink signaling channel resource;
receiving, from the eNB, a collision message and neighbor resource allocation information of a neighbor eNB, when the resources allocated to the eNB collide with resources allocated to the neighbor eNB, the neighbor resource allocation information including information on the resources allocated to the neighbor eNB;
changing the resources allocated to the eNB based on the collision message and the neighbor resource allocation information; and
transmitting, to the eNB, changed resource allocation information including information on the changed resources allocated to the eNB, the changed resources being associated with a resource index excluding a resource index used by the neighbor eNB.

6. The method of claim 5, wherein changing the resources allocated to the eNB comprises changing the resources allocated to the eNB based on the received neighbor resource allocation information.

7. The method of claim 5, further comprising:
receiving, from the eNB, a notification message requesting to establish a relation with a new neighbor eNB;
determining that the resources allocated to the eNB collide with resources allocated to the new neighbor eNB;
changing the resources allocated to the eNB; and
transmitting, to the eNB, another resource allocation information including information on the changed resources, in response to the notification message.

8. The method of claim 7, wherein the resources allocated to the eNB collide with the resources allocated to the new neighbor eNB, when the resources allocated to the eNB are the same as the resources allocated to the new neighbor eNB.

9. An apparatus of resource allocation for a base station (eNB) for multi-cell coordination using an uplink signal channel, the apparatus comprising:
a communication unit configured to communicate with a server and a neighbor eNB; and
a control unit configured to control a process of:
receiving, from the server, resource allocation information including information on resources allocated to the eNB, the resources being associated with an uplink signaling channel resource;
determining that the resources allocated to the eNB collide with resources allocated to the neighbor eNB;
transmitting, to the server, a collision message and neighbor resource allocation information of the neighbor eNB when the resources allocated to the eNB collide with the resources allocated to the neighbor eNB, the neighbor resource allocation information including information on the resources allocated to the neighbor eNB;
receiving, from the server, changed resource allocation information including information on changed resources allocated to the eNB, the changed resources being associated with a resource index excluding a resource index used by the neighbor eNB; and
distributing the changed resources to a user equipment.

10. The apparatus of claim 9, wherein the control unit controls the process of determining that the resources allocated to the eNB collide with the resources allocated to the neighbor eNB by:
receiving the neighbor resource allocation information; and
determining whether the resources allocated to the eNB collide with the resources allocated to the neighbor eNB, based on the neighbor resource allocation information of the eNB and the neighbor resource allocation information of the neighbor eNB.

11. The apparatus of claim 10, wherein the resources allocated to the eNB collide with the resources allocated to the neighbor eNB, when the resources allocated to the eNB are the same as the resources allocated to the neighbor eNB.

12. The apparatus of claim 9, wherein the control unit is further configured to control a process of:
determining that a relation with a new neighbor eNB is to be established;
transmitting, to the server, a notification message requesting to establish the relation with the new neighbor eNB; and
receiving, from the server, another changed resource allocation information, in response to the notification message.

13. An apparatus of resource allocation for a server for multi-cell coordination using an uplink signal channel, the apparatus comprising:
a communication unit configured to communicate with a base station (eNB); and
a control unit configured to control a process of:
allocating resources to the eNB;
transmitting, to the eNB, resource allocation information including information on the resources allocated to the eNB, the resources being associated with an uplink signaling channel resource;
receiving, from the eNB, a collision message and neighbor resource allocation information of a neighbor eNB when the resources allocated to the eNB collide with resources allocated to the neighbor eNB, the neighbor resource allocation information including information on the resources allocated to the neighbor eNB;
changing the resources allocated to the eNB based on the collision message and the neighbor resource allocation information; and
transmitting, to the eNB, changed resource allocation information including information on the changed resources allocated to the eNB, the changed resources being associated with a resource index excluding a resource index used by the neighbor eNB.

14. The apparatus of claim 13, wherein the control unit is further configured to control changing the resources allocated to the eNB, based on the received neighbor resource allocation information.

15. The apparatus of claim 13, wherein the control unit is further configured to control a process of:
    receiving, from the eNB, a notification message requesting to establish a relation with a new neighbor eNB;
    determining that the resources allocated to the eNB collide with resources allocated to the new neighbor eNB;
    changing the resources allocated to the eNB; and
    transmitting, to the eNB, another resource allocation information including information on the changed resources, in response to the notification message.

16. The apparatus of claim 15, wherein the resources allocated to the eNB collide with the resources allocated to the new neighbor eNB, when the resources allocated to the eNB are the same as the resources allocated to the new neighbor eNB.

* * * * *